Patented Aug. 9, 1938

2,126,510

UNITED STATES PATENT OFFICE 2,126,510

CELLULOSE MIXED ESTER SHEETING CONTAINING A LOWER ALKYL MYRISTATE

Henry B. Smith, Rochester, N. Y., assignor, by mesne assignments, to Eastman Kodak Company, Jersey City, N. J., a corporation of New Jersey No Drawing. Application December 26, 1935, Serial No. 56,237

3 Claims. (Cl. 106—40)

This invention relates to plasticizers for mixed organic acid esters of cellulose, such, for instance, as cellulose acetate-propionate, cellulose acetate-butyrate, cellulose acetate-stearate and the like. One object of the invention is to provide cellulose mixed ester compositions from which flexible sheets and other useful plastic products may be made. Another object is to provide flexible sheets of cellulose mixed esters, such as are useful for photographic film, wrapping sheets, etc. Other objects will hereinafter appear.

Cellulose acetate-propionate has become known only within the last few years, and the field of plasticizers for it and for other mixed esters of cellulose is, as yet, not well explored, although certain plasticizers for these esters have recently been discovered, such, for instance, as tri-o-diphenyl phosphate, diamyl hydroquinone, monobutyl glyceryl oleate, ethoxyethyl laurate, diacetyl glyceryl stearate, ethoxyethyl stearate, ethylene glycol dilaurate and chlorinated paraffin oil.

Fully esterified cellulose acetate-propionate, cellulose acetate-butyrate, etc., may be prepared as described in Clarke and Malm's U. S. Patent No. 1,800,860. The preparation of partially hydrolyzed cellulose acetate-propionate and other mixed esters, i. e., cellulose acetate-propionate, etc., from which a portion of the acyl groups has been hydrolyzed off, is described in the co-pending application of Carl J. Malm and Charles E. Fletcher Serial No. 551,546, Patent No. 2,026,583. Cellulose acetate-stearate may be prepared as described in Clarke and Malm's U. S. Patent No. 1,987,053.

Cellulose acetate-propionate, acetate-butyrate, etc. have properties differing from those of cellulose acetate. For instance, propylene chloride and ethylene chloride, which alone are not solvents for cellulose acetate—either fully esterified or partially hydrolyzed—readily dissolve a majority of these cellulose esters, whether fully esterified or partially hydrolyzed, and sheets coated from such solutions, even without a plasticizer, show fair flexibility, as is disclosed in Carl J. Malm's U. S. Patent No. 2,006,362. Furthermore, acetone is a solvent for unhydrolyzed or fully esterified cellulose acetate-propionate, although sheets coated from such solutions are brittle, whereas unhydrolyzed cellulose acetate is not soluble in acetone.

Consistently with the unexpected behavior of the cellulose mixed esters, I have now found that certain compounds which are scarcely compatible with commercial forms of cellulose acetate are excellent plasticizers for cellulose acetate-propionate, cellulose acetate-butyrate, etc. The lower alkyl myristates, such as methyl and ethyl myristates, while they may be compatible with cellulose nitrate, are incompatible with the only commercially-used form of cellulose acetate, namely, acetone-soluble cellulose acetate, and consequently, nowhere in the art have they ever been suggested as components of cellulose acetate compositions. Contrary to expectation, I have discovered that the lower alkyl myristates, such as methyl and ethyl mryistates, are compatible with, and excellent plasticizers for, both fully esterified and partially hydrolyzed cellulose mixed organic acid esters, such as cellulose acetate-propionate, cellulose acetate-butyrate, cellulose acetate-stearate, etc. The ratio of acetyl radical to higher fatty acid radical in the cellulose mixed ester may be varied within wide limits.

In order that those skilled in the art may better understand my invention I would state, by way of illustration, that for the manufacture of photographic film base or other sheets my new compositions of matter may be compounded as follows: 100 parts by weight of substantially fully esterified cellulose acetate-propionate is dissolved with stirring in from 500 to 600 parts by weight of ethylene chloride. To this solution may be added from 5 to 30 parts by weight, or even more, of methyl myristate or ethyl myristate. Within the limits stated, the amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. A film so produced has permanently brilliant transparency and low inflammability, burning no more readily than ordinary newsprint. Films or sheets produced in accordance with my invention are tough and extremely flexible. For instance, films of fully esterified cellulose acetate-propionate plasticized with from 10% to 30% of methyl myristate (parts by weight based on the weight of the cellulose ester) had an initial flexibility of from 300% to 560% of that of a film of the same cellulose ester with no plasticizer, and films of fully esterified cellulose acetate-propionate plasticized with from 10% to 30% of ethyl myristate had an initial flexibility of from 320% to 680% of that of a film of the same cellulose ester with no plasticizer.

Furthermore, films plasticized with my novel plasticizers maintain flexibility in a superior fashion. For instance, a film of fully esterified cellulose acetate-propionate containing 20% of methyl myristate (20 parts by weight of methyl myristate per 100 parts of cellulose ester) retained flexibility at 65° C. for 114 days, and films containing from 20 to 30% of ethyl myristate or 30% of methyl myristate retained flexibility for 121 days, whereas an unplasticized film of the same cellulose ester had become brittle at the end of 72 days. This indicates that film so plasticized will withstand ordinary usage satisfactorily for many years.

Other solvents which are compatible with the cellulose ester being used, and with the plasticizer, may be employed instead of those mentioned above. Other mixed esters of cellulose, such, for instance, as cellulose acetate-butyrate and cellulose acetate-stearate, showed similar results. Partially hydrolyzed mixed esters showed results similar to those shown by the fully esterified esters.

While I have described the manufacture of films and sheets from my new compositions, it will be apparent that they may be employed with advantage in the other branches of the plastic art, such, for instance, as in the manufacture of lacquers.

What I claim as my invention and desire to be secured by Letters Patent of the United States is:

1. A transparent, flexible sheet comprising 100 parts by weight of a cellulose mixed organic acid ester selected from the group consisting of cellulose acetate-propionate, cellulose acetate-butyrate and cellulose acetate-stearate and, as a plasticizer therefor, from 5 to 30 parts by weight of a lower alkyl myristate.

2. A transparent, flexible sheet comprising 100 parts by weight of a cellulose mixed organic acid ester selected from the group consisting of cellulose acetate-propionate, cellulose acetate-butyrate, and cellulose acetate-stearate and, as a plasticizer therefor, from 5 to 30 parts by weight of methyl myristate.

3. A transparent, flexible sheet comprising 100 parts by weight of a cellulose mixed organic acid ester selected from the group consisting of cellulose acetate-propionate, cellulose acetate-butyrate and cellulose acetate-stearate and, as a plasticizer therefor, from 5 to 30 parts by weight of ethyl myristate.

HENRY B. SMITH.